United States Patent
Belley

[19]

[11] Patent Number: 6,011,335
[45] Date of Patent: Jan. 4, 2000

[54] REINFORCED MOTOR FRAME LEAD CHANNEL

[75] Inventor: Richard Belley, St. Louis, Mo.

[73] Assignee: Emerson Electric Co., St. Louis, Mo.

[21] Appl. No.: 09/139,034

[22] Filed: Aug. 24, 1998

[51] Int. Cl.[7] .......................... H02K 5/00; H02K 15/00; H02K 11/00
[52] U.S. Cl. ............................... 310/89; 310/42; 310/71
[58] Field of Search .................................. 310/89, 90, 88, 310/42, 87, 86, 71; 174/50, 65 R, 65 G

[56] References Cited

U.S. PATENT DOCUMENTS

| | | |
|---|---|---|
| 1,488,498 | 4/1924 | Hoff . |
| 1,531,152 | 3/1925 | Steen . |
| 1,851,572 | 3/1932 | Ehrenfeld . |
| 2,367,079 | 1/1945 | Wiest ...................................... 172/275 |
| 2,430,422 | 11/1947 | Happe ...................................... 172/36 |
| 2,673,300 | 3/1954 | Furnas et al. .............................. 310/71 |
| 2,858,357 | 10/1958 | McCulloch ................................ 174/52 |
| 5,268,607 | 12/1993 | McManus .................................. 310/89 |
| 5,581,137 | 12/1996 | Lundquist et al. ..................... 310/68 R |
| 5,630,461 | 5/1997 | CoChimin ................................. 164/34 |
| 5,877,576 | 3/1999 | CoChimin ............................... 310/254 |

*Primary Examiner*—Elvin Enad
*Assistant Examiner*—Dang Dinh Le
*Attorney, Agent, or Firm*—Howell & Haferkamp, L.C.

[57] ABSTRACT

A frame or housing for an electrical device such as a motor or generator, is cast of metal and includes an integral lead channel to accommodate electrical wiring leads of the electrical device and an egress opening in the channel through which the leads pass. The lead channel configuration directs the electrical leads inserted into the channel from one of the axially opposite ends of the electrical device contained in the frame toward the egress opening at the center of the frame. A reinforcing rib, cast as an integral part of the frame, extends circumferentially across the lead channel inside the egress opening and stiffens the channel while also providing a portion of a continuous circumferential surface on the interior of the frame that engages around the electrical device secured in the frame.

26 Claims, 5 Drawing Sheets

REINFORCED MOTOR FRAME LEAD CHANNEL

BACKGROUND OF THE INVENTION (1) Field of the Invention

The present invention pertains generally to the configuration of a frame or housing for an electrical device such as a motor or generator, where the frame is cast of metal and includes an integral lead channel to accommodate electrical wiring leads of the electrical device and an egress opening in the channel through which the leads pass. The lead channel configuration directs the electrical leads inserted into the channel from one of the axially opposite ends of the electrical device contained in the frame toward the egress opening at the center of the frame. A reinforcing rib extends circumferentially across the lead channel inside the egress opening and stiffens the channel while also providing a portion of a continuous circumferential surface on the interior of the frame that engages around the electrical device secured in the frame. The rib is also cast as an integral part of the frame.

(2) Description of the Related Art

The construction of conventional electrical devices such as electric motors and generators typically includes an enclosure such as a substantially cylindrical frame or housing that is cast of metal as a single tubular wall having a cylindrical interior surface and having a plurality of heat radiating ribs or fins extending longitudinally across its exterior surface. These types of enclosures, often referred to as frames, are employed with various types of machines where the radiating fins dissipate heat away from the machine contained in the frame. Where such frames are employed with electrical devices such as motors and generators, the frame is typically cast of metal such as cast iron.

The frame tubular wall has a cylindrical interior surface that is dimensioned to receive the electrical device, such as an electric motor or generator hereinafter referred to as the core device, in a tight, friction fit around the core device that securely holds the core device in the frame interior preventing any relative movement between the core device and the frame tubular wall, and maximizing heat transferred to cooling fins. In assembling the core device into the tubular wall interior, the core device can be press-fit into the tubular wall interior or the tubular wall can be heated and expanded prior to insertion of the core device therein. On cooling of the tubular wall, it contracts around the core device and thereby provides the tight friction fit that securely holds the core device in the tubular wall of the frame.

The tubular wall of the frame has axially opposite front and rear openings through one of which the core device is inserted. End caps are later secured over these openings. The end caps support bearings that in turn support the rotating shaft of the core device. Also, the end caps will also have an egress opening for the electrical leads of the core device, which are usually positioned at one of the axial ends of the core device, to pass through. An outlet box is often attached over the egress opening.

In many frame constructions, it is desirable to position the outlet box on an exterior side of the frame tubular wall intermediate the axially opposite front and rear openings. In frame constructions of this type, due to the tight circumferential fit of the frame tubular wall around the core device, provisions must be made in the frame construction to accommodate the electrical leads of the core device that extend from one or both of the opposite axial ends of the core device to the electrical lead egress opening in the frame. In the past, an elongated opening has been provided through the frame tubular wall where the elongated opening would extend axially beyond the axially opposite ends of the core device so that the electrical leads of the core device could be passed through one or both of the opposite ends of the elongated opening. A cover would be positioned over the elongated opening on the exterior of the frame tubular wall and secured to the tubular wall by separate mechanical fasteners. Alternatively, the cover would be cast integrally with the frame tubular wall. The cover would have an egress opening at its center. The electrical leads extending from one or both of the axially opposite ends of the core device would be passed through the axially opposite ends of the elongated opening in the frame tubular wall and then through the channel formed by the cover to the egress opening at the center of the cover. The electrical leads would then pass through the egress opening to an outlet box secured to the exterior of the channel cover.

A number of shortcomings have been observed in the construction of frame enclosures for core devices of the type described above. The elongated opening provided through the frame tubular wall to accommodate the electrical leads would significantly reduce the hoop stiffness or strength of the frame enclosure, thus reducing heat transferred to cooling fins. What is meant by the hoop stiffness or strength is the resistance of the frame enclosure tubular wall to circumferential or radial expansion. It can be seen that the hoop stiffness or strength is critical in the ability of the frame enclosure tubular wall to securely hold the core device in friction engagement in the interior of the tubular wall and to ensure adequate heat transfer. With an elongated opening extending axially across the tubular wall of the frame enclosure, its ability to resist radial expansion or circumferential stretching is reduced.

Also, with the elongated opening extending axially or longitudinally across the tubular wall of the frame, areas of stress concentration are created at the axially opposite ends of the opening. After repeated thermal expansion and contraction from cylic operation of the core device, cracks could form in these areas of stress concentration.

To overcome the problem of radial expansion or circumferential stretching of the frame enclosure tubular wall when the core device is inserted into the interior of the frame enclosure and when the core device is repeatedly heated-up and cooled-down, stiffeners have been added that extend circumferentially across the elongated openings in the frame tubular walls. The common thinking in the past has been that a larger stiffener extending circumferentially across the elongated opening in the frame tubular wall will provide greater hoop strength to the tubular wall of the frame enclosure and reduce the areas of stress concentration. However, because the interior of the frame tubular wall must have a smooth cylindrical surface to accommodate the core device inserted into the tubular wall, the stiffeners traversing the elongated openings in the frame tubular walls are positioned outside the frame interiors and occupy the area of the electrical lead channel leading from the axially opposite ends of the frame tubular wall to the lead egress opening at the center of the channel. The presence of the hoop strength stiffener in the channel interiors would interfere with the passing of the electrical leads from one or both of the axially opposite ends of the core device through the axially opposite ends of the elongated opening in the frame tubular wall and through the channel to the egress opening at the center of the channel. This increased the difficulty and time required to assemble core devices in frame enclosures of this type, particularly where the core devices were large and the electrical leads were stiff and difficult to manually bend and pass through the channels to the egress openings at the centers of the channels.

What would overcome these shortcomings of prior art frame enclosures would be an improved frame enclosure having a lead channel shaped to facilitate the passage of electrical leads from the axially opposite ends of the core device through the channel to an egress opening at the center of the channel, and which also provides circumferential contact around the core device and a sufficient hoop strength or stiffness of the frame enclosure to securely hold the core device therein without increasing the difficulty of manually passing the core device electrical leads through the lead channel to the egress opening at the center of the lead channel.

SUMMARY OF THE INVENTION

The present invention pertains to the configuration of a cast frame or housing enclosure for an electrical device such as an electric motor, generator or some other similar device. Such electrical devices will be referred to herein as core devices.

The frame enclosure is similar to known types of enclosures in that it is cast of cast iron in a general cylindrical configuration surrounding a hollow interior of the frame. A circular front opening and axially opposite circular rear opening provide access to the frame hollow interior. A plurality of radiating fins are formed on the exterior surface of the frame and extend longitudinally over the exterior surface generally parallel with the center axis of the frame interior. The interior surface of the frame is, for the most part, cylindrical and is dimensioned to receive the core device therein in a tight friction fit.

The interior cylindrical surface of the frame enclosure is interrupted by a channel surface that defines a lead channel in the interior surface. The channel surface extends between the opposite front and rear openings of the frame but is spaced from the openings. The channel surface slopes away from the frame center axis as it extends from the opposite front and rear openings toward a center of the channel surface located at the axial center of the frame. In addition, the channel surface defines a hollow channel adjacent the hollow interior of the frame. The channel, defined by the channel surface is circumferentially wider adjacent the opposite front and rear openings of the frame and becomes narrower as the channel surface extends from the frame axially opposite ends toward the center of the channel surface and the center of the channel defined by the surface.

The channel surface and the channel it defines in the interior of the frame produce a corresponding protrusion on the exterior surface of the frame. The protrusion encloses the channel surface and the channel it defines and therefore has the same general configuration on the exterior of the frame as the channel surface. An egress opening passes through the center of the protrusion and communicates with the channel in the interior of the protrusion.

A rib or stiffener spans across the channel in the interior of the frame on the opposite side of the egress opening formed through the channel protrusion. The rib serves three functions, it provides hoop strength or stiffness to the frame by extending across the channel and securing together portions of the frame interior surface on opposite sides of the channel. In addition, a surface of the rib that faces toward the center axis of the frame has a complimentary curvature to that of the frame interior surface and together with the frame interior surface forms a complete cylindrical surface in the interior of the frame that will engage around the perimeter of the core device inserted into the frame and securely hold the core device in the frame. In addition, a surface of the rib that is opposite the surface that completes the cylinder in the frame interior is tapered toward the egress opening. This tapered surface directs electrical leads inserted through the channel defined by the channel surface from the axially opposite ends of the frame toward the egress opening and the exterior of the frame, thus facilitating the advancing of the electrical leads of the core device through the channel and out through the egress opening.

The frame enclosure with its channel and the rib stiffener can all be molded together as an integral, monolithic unit by a lost-foam casting process.

BRIEF DESCRIPTION OF THE DRAWINGS

Further objects and features of the present invention are revealed in the following detailed description of the preferred embodiment of the invention and in the drawing figures wherein.

DESCRIPTION OF THE PREFERRED EMBODIMENT

Figure 1:
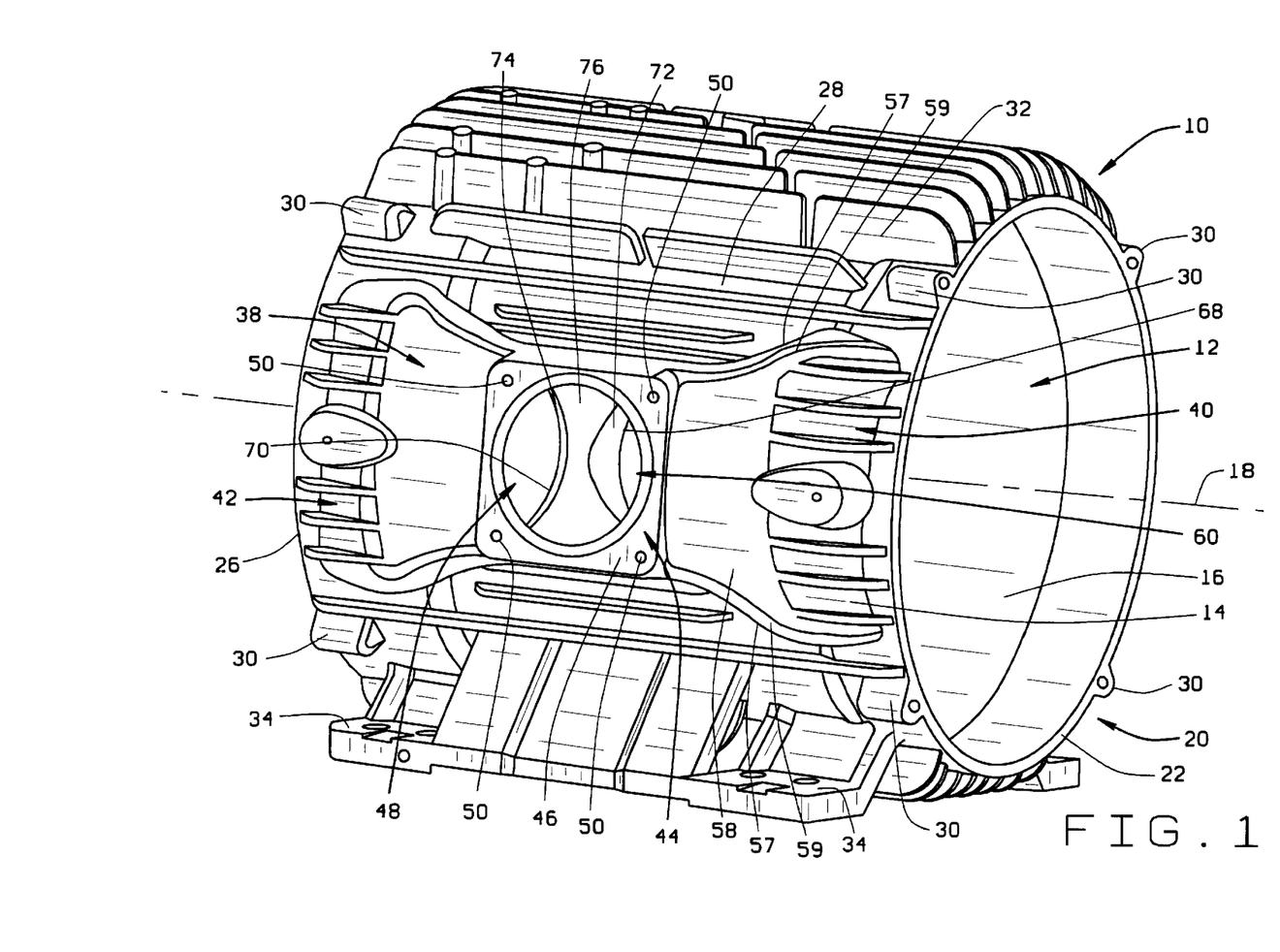
FIG. 1 is a side perspective view of the frame enclosure of the invention.
Figure 2:
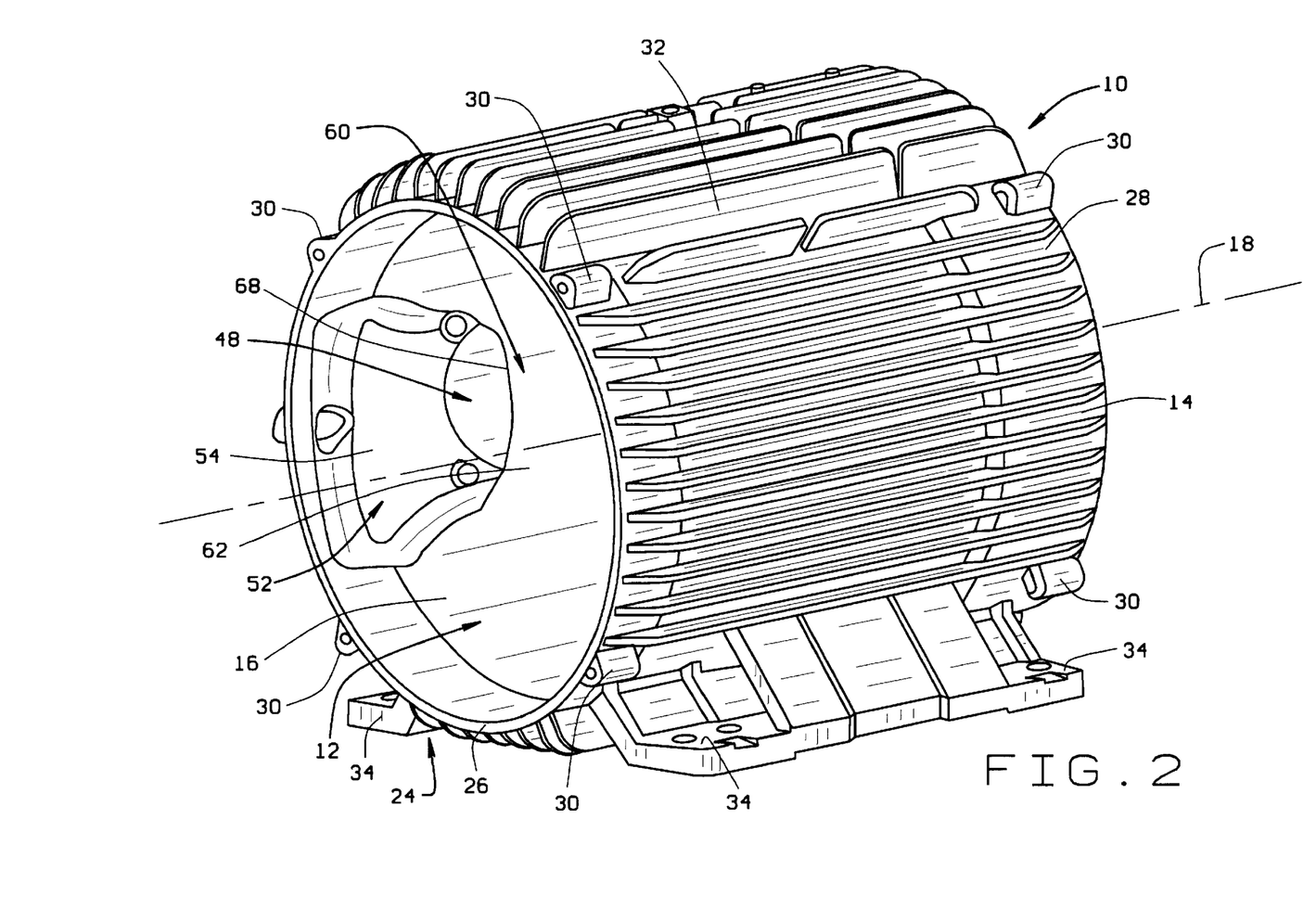
FIG. 2 is a side perspective view of the frame of FIG. 1 viewed from the opposite side of the frame.

FIGS. 1 and 2 are opposite side views of a frame enclosure including the subject matter of the invention. What is meant by frame enclosure or frame is a housing for an electrical device such an electric motor, generator or other similar device. Such electrical devices are referred to generally herein as core devices. In the preferred embodiment of the invention all of its component parts to be described are integrally cast as a monolithic unit and are preferably cast in cast iron by a lost-foam process.

The frame enclosure 10 is similar to known types of enclosures in that it is cast of cast iron in a generally cylindrical configuration with a hollow interior 12 surrounded by a tubular wall 14 of the frame. A cylindrical interior surface 16 of the frame tubular wall 14 surrounds the hollow interior 12. The interior surface 16 is not entirely cylindrical but is interrupted by two openings or recesses that provide access or entry to an electrical lead channel from axially opposite ends of the frame, as will be explained. The cylindrical interior surface 16 of the tubular wall 14 has a center axis 18 passing through the hollow interior of the frame. A circular front opening 20 defined by a circular front edge 22 of the frame and a circular rear opening 24 defined by a circular rear edge 26 of the frame provide access to the frame interior 12 from axially opposite ends of the frame tubular wall 14. The interior surface 16 is given circumference and diameter dimensions that are suited for the particular core device to be enclosed within the frame. Because the core device can be inserted into the frame according to several known methods, the interior dimensions of the frame will be dictated by the particular core device and the manner in which it is assembled into the frame. For example, the core device could be pressed into the frame interior where the cylindrical interior surface 16 will engage around the circumference of the core device and thereby securely hold the core device in the frame interior 12. Alternatively, the frame tubular wall 14 could be heated to expand the frame and thereby slightly expand the volume of the frame interior 12. The core device could then be inserted into the expanded frame. When the frame is allowed to cool, it shrinks around the core device and thereby the interior surface 16 securely engages around the circumference of the core device holding the core device inside the frame interior 12.

The exterior surface 28 of the frame 10 is generally cylindrical except for the presence of several features, some of which are typical to the constructions of frame enclosures and some of which form a part of the inventive subject matter. Several lands 30 are spatially arranged on the exterior surface 28 adjacent the front 20 and rear 24 openings of the frame. These lands 30 have internally threaded screw holes that receive threaded fasteners employed in attaching end caps (not shown) over the opposite front 20 and rear 24 openings of the frame. The end caps typically support bearings that in turn support the rotating shafts of electrical devices such as motors or generators enclosed in frames of the type described. A plurality of heat radiating fins 32 are also provided on the exterior surface 28 extending generally longitudinally or axially over the exterior surface. Several support feet 34 are also provided on the frame exterior surface 28 and are employed in attaching the frame to structures with which the core device secured in the frame is employed. The fastener lands 30, heat radiating fins 32 and support feet 34 are all cast as integral parts with the frame 10 and are typical of known frame constructions.

A protrusion 38 is also provided on the frame exterior surface 28. The shape of the protrusion 28 on the exterior of the frame 10 is determined by the shape of a channel formed into the frame interior surface 16 which is yet to be described. As viewed in FIG. 1, with the center axis 18 of the frame oriented horizontally, the protrusion 38 has a general "bow-tie" configuration. With the center axis 18 of the frame oriented vertically, the protrusion 38 has a general "hourglass" configuration. As viewed in FIG. 1, a forward end 40 and a rearward end 42 of the protrusion have the same circumferential width that extends around a portion of the circumference of the exterior surface 28 adjacent the front opening edge 22 and rear opening edge 26, respectively. As the protrusion 38 extends from its opposite forward 40 and rearward 42 ends longitudinally or axially inwardly across the frame exterior surface 28, the protrusion narrows circumferentially until it reaches a center 44 of the protrusion. At the protrusion center 44 a generally square base is formed having a flat base surface 46 with a center egress hole 48 through the base surface 46 to the frame interior 12. The egress hole 48 has a center axis that is perpendicular to the center axis 18 of the frame. Internally threaded fastener holes 50 surround the egress hole. The flat base surface 46 and the fastener holes 50 are provided for attachment of an outlet box (not shown) to the base surface to receive the ends of electrical leads from a core device contained inside the frame 10 and passed through the egress hole 48.

Figure 3:
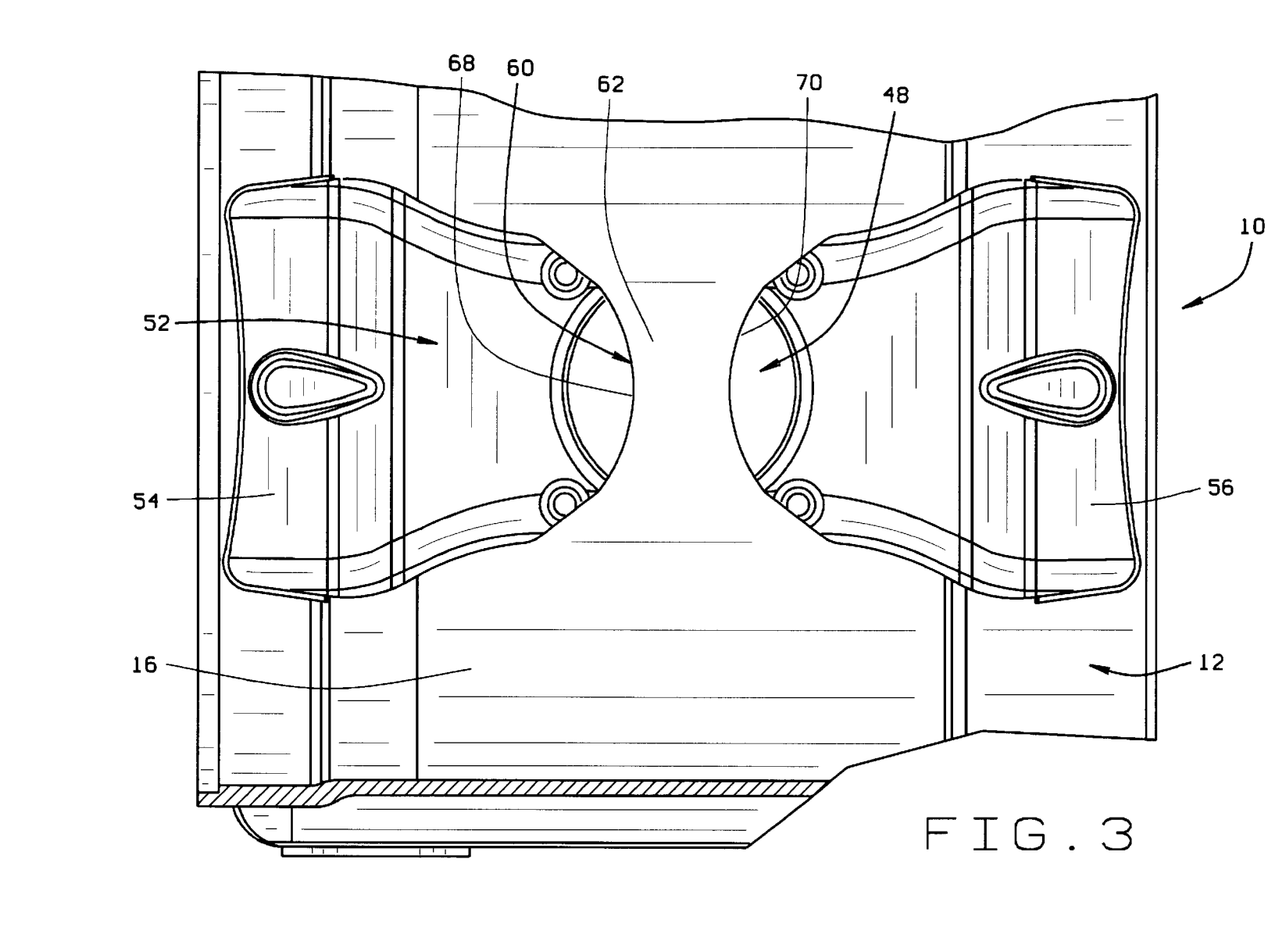
FIG. 3 is a partial view of the interior surface of the frame showing the configuration of the channel.
Figure 4:
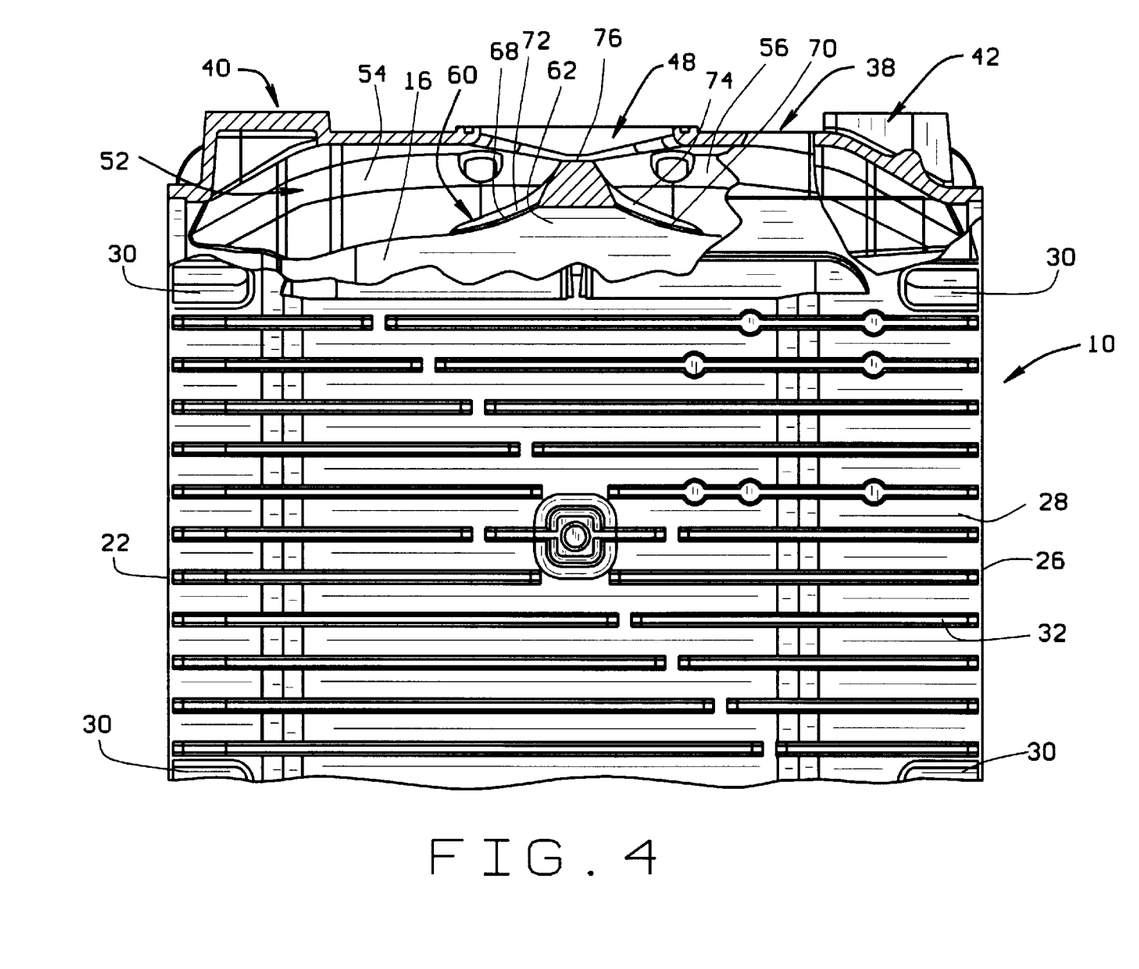
FIG. 4 is a partial plan view of the frame with portions of the frame broken away to provide a sectioned view of the channel and the rib stiffener.
Figure 5A:
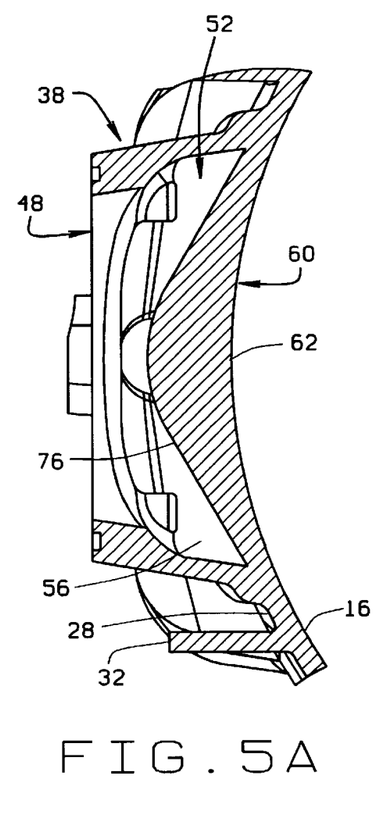
FIGS. 5A–5D are partial, sectioned views of the rib stiffener in the frame channel.
Figure 5B:
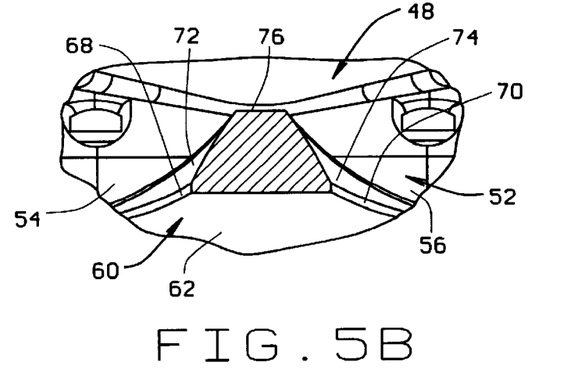
Figure 5C:
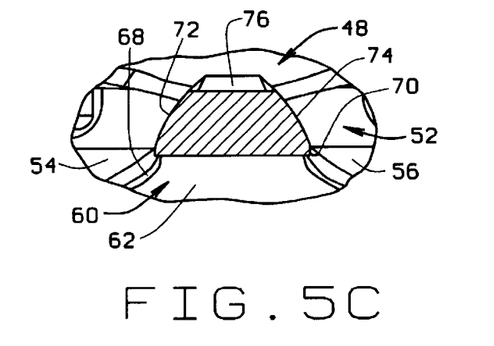
Figure 5D:
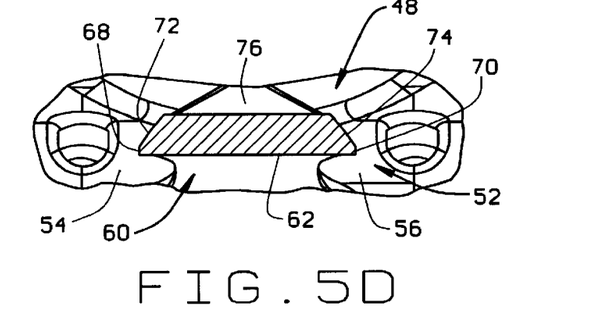

On the opposite side of the protrusion 38 there is an electric lead channel 52 defined by a channel surface that is recessed into the cylindrical interior surface 16 of the tubular wall 14. The channel surface has a forward portion 54 adjacent the front edge 22 of the frame tubular wall 14 and a rearward portion 56 adjacent the rear edge 26 of the frame tubular wall. As can be seen in FIG. 3, the channel surface forward portion 54 and rearward portion 56 are mirror images of each other. The forward and rearward portions 54, 56 of the channel surface taper or slope gradually away from the frame center axis 18 and the interior surface 16 of the frame as the surfaces extend from adjacent the respective front edge 22 and rear edge 26 of the frame toward the center of the frame where they meet at the egress hole 48. Additionally, the forward and rearward portions 54, 56 of the channel surface are circumferentially wider adjacent the respective front and rear edge openings 22, 26 and become narrower as they extend toward each other and the egress hole 48. This configuration of the channel 52 serves two purposes: 1) it facilitates manually feeding electrical leads through the channel from the opposite forward and rearward openings 20, 24 of the frame to the center of the channel and the egress hole 48, and 2) because the side surfaces 57 of the channel do not run parallel to the frame axis, they offer improved resistance to circumferential expansion of the frame than the resistance that would be provided by a channel having side surfaces that ran parallel to the frame axis. In viewing FIG. 1, it can be seen that the circumferentially opposite side surfaces 57 of the forward portion of the channel protrusion gradually converge toward each other as the side surfaces 57 extend from the front edge 22 of the frame tubular wall toward the center of the protrusion 38. Where these opposite side surfaces 57 converge with the exterior surface 58 of the channel protrusion, curved edges or bends 59 are formed. These curved edges 59 also converge toward each other as they extend from adjacent the front edge 22 of the frame tubular wall toward the center of the protrusion 38. The curvature of the edges 59 gives an improved resistance to circumferential forces that would tend to pull the curved edges apart from each other, such as those forces that would be exerted on these curved edges when the core device is pressed into the frame. It can be seen that if the opposite edges 59 between the channel side surface 57 and the exterior surface 58 ran parallel with the frame center axis 18, circumferential forces pulling the side surfaces 57 away from each other from a core device being press-fit into the frame would have a greater tendency to bend the side surfaces 57 away from each other. Thus, the curved or tapered configuration provided in the edges 59 between the opposite side surfaces 57 of the channel and the channel exterior surface 58 provide greater resistance to circumferentially directed forces and thereby enhance the hoop strength or stiffness of the frame. Although the side surfaces 57 and their edges 59 joining them to the channel exterior surface 58 at the forward portion 54 of the channel are described, the same is true of the side surfaces and edges of the rearward portion 56 of the channel protrusion. Because the channel forward and rearward portions 54, 56 narrow as they extend toward the egress hole 48, add rigidity to the channel circumferentially and will direct the electrical leads passed through the channel to the egress hole. Apart from the presence of the channel 52 defined by the channel surface portions 54, 56, the frame interior surface 16 is cylindrical.

The hoop strength or stiffness of the frame 10 is enhanced by the presence of a rib 60 that extends circumferentially across the channel 52 connecting the frame cylindrical interior surface 16 on opposite sides of the channel 52. The rib stiffener 60 has an interior surface 62 that faces toward the frame center axis 18 and together with the frame interior surface 16 forms a continuous cylindrical surface at the center of the frame interior 12. As best seen in FIG. 3, the rib 60 is wider at its opposite ends that merge with the frame interior surface 16 and narrows as it extends toward its center. The purpose of this geometry is to allow maximum clearance for lead insertion from the channel inside area to the lead exist 48. Front and rear edges 68, 70 of the rib separate the rib interior surface 62 from forward 72 and rearward 74 channel surfaces of the rib opposite the rib interior surface 62. The forward 72 and rearward 74 rib channel surfaces are also mirror images of each other and are separated from each other by a center ridge 76 of the rib. As can best be seen in FIGS. 4 and 5A–5D, the forward 72 and rearward 74 rib channel surfaces taper toward the egress hole 48 as they extend from the opposite ends of the rib that merge with the frame interior surface 16, and also taper toward the egress hole 48 as they extend from the front 68 and rear 70 edges of the rib toward the rib center ridge 76. This configuration of the rib stiffener 60 gives it a constant cross-sectional area in any plane passed through the rib that is perpendicular to the cylindrical interior surface 16 of the frame. This configuration ensures that stress is distributed through the rib and there will be no areas of significant stress concentration in the rib. Also, the tapering of the forward and rearward rib channel surfaces 72, 74 from the respective front and rear edges 68, 70 of the rib toward the egress hole 48 functions to direct electrical leads passed through the channel 52 across the rib surfaces and out through the egress hole 48.

The construction of the channel 52 and the rib stiffener 60 described above facilitates the manual passing of electrical leads from a core device contained in the frame enclosure 10 through either end of the channel 52 and out of the frame through the egress hole 48. In addition, the configuration of the rib stiffener 60 also facilitates the passage of the electrical leads of the core device through the egress hole 48 while increasing the hoop strength or stiffness of the frame as well as providing a continuous cylindrical interior surface in the frame to engage around the entire periphery of the core device inserted into the frame.

In the preferred embodiment of the invention, the frame 10 including the channel 52 and the rib stiffener 60 are cast of metal as a single, monolithic unit. Although other casting processes can be used successfully (e.g. chemically bonded sand), in this particular example, a lost-foam casting process is employed to produce the unitary frame. The process is well known in the art, and generally involves forming a blank of the frame, including the rib stiffener, of a foam typically used in a lost-foam molding process such as polystyrene. The frame and rib of foam can be formed separate or as a single unit. If formed of the foam separately, the rib is glued in place in the foam frame interior extending across the channel behind the egress hole. The foam blank is then placed in a sand molding box and molding sand is compacted around the blank. Molten metal, for example cast iron, is then poured into the sand mold box. As the molten metal comes into contact with the foam blank, the foam is dissolved and the void in the sand mold created by the dissolving foam is replaced by the molten metal. In this manner, the frame enclosure 10 of the present invention and its rib stiffener 60 are formed as a single, monolithic cast unit.

While the present invention has been described by reference to a specific embodiment, it should be understood that modifications and variations of the invention may be constructed without departing from the scope of the invention defined in the following claims. For example, the channel of the invention may be employed on an enclosure without the stiffening rib and the rib may be employed on an enclosure without the channel.

What is claimed:

1. An enclosure for an electrical device, the enclosure comprising:

a tubular wall having an exterior surface and an interior surface, the interior surface surrounding a hollow interior of the enclosure, the interior surface is cylindrical and has a center axis that passes through the center of the hollow interior, the interior surface is spaced a first radial distance from the center axis;

front and rear openings at opposite ends of the tubular wall providing access to the hollow interior at the opposite ends of the tubular wall;

a hole through the tubular wall between the front and rear openings;

a channel formed into the interior surface, the channel intersecting the hole, the channel has a channel surface that is recessed into the interior surface and defines the channel, the channel surface extends radially outwardly from the interior surface and the center axis;

a portion of the interior surface extends across a rib in the tubular wall and a portion of the channel surface extends across the rib on an opposite side of the rib from the portion of the interior surface; and the rib has front and rear edges adjacent the respective front and rear openings of the tubular wall, the front and rear edges separate the portion of the interior surface on the rib from the portion of the channel surface on the rib, and the portion of the channel surface tapers toward the hole in the tubular wall and away from the tubular wall center axis as the portion of the channel surface extends from the front edge of the rib toward the hole in the tubular wall.

2. The enclosure of claim 1, wherein:
   the rib extends across the hole.

3. The enclosure of claim 1, wherein:
   the tubular wall and the rib are one monolithic piece of metal.

4. The enclosure of claim 1, wherein:
   the channel surface slopes away from the interior surface while extending from adjacent the front opening in the tubular wall toward the hole.

5. The enclosure of claim 4, wherein:
   the channel surface slopes away from the interior surface while extending from adjacent the rear opening in the tubular wall toward the hole.

6. The enclosure of claim 1, wherein:
   the portion of the channel surface tapers toward the hole in the tubular wall and away from the tubular wall center axis as the portion of the channel surface extends from the rear edge of the rib toward the hole in the tubular wall.

7. An enclosure for an electrical device, the enclosure comprising:

a tubular wall having an exterior surface and an interior surface, the interior surface surrounding a hollow interior of the enclosure;

front and rear openings at opposite ends of the tubular wall providing access to the hollow interior at the opposite ends of the tubular wall;

a hole through the tubular wall between the front and rear openings;

a channel formed into the interior surface, the channel intersecting the hole;

a protrusion extends from the exterior surface opposite the channel and the hole passes through the protrusion; and the protrusion has opposite ends adjacent the front and rear openings in the tubular wall and is wider at its opposite ends and narrower at a center of the protrusion between its opposite ends.

8. The enclosure of claim 7, wherein:

the hole is centered in the protrusion.

9. The enclosure of claim 7, wherein:

the protrusion has circumferentially opposite curved edges that curve and gradually converge toward each other as they extend from adjacent the front and rear openings in the tubular wall toward the center of the protrusion.

10. An enclosure for an electrical device, the enclosure comprising:

a tubular wall having an exterior surface and an interior surface, the interior surface surrounding a hollow interior of the enclosure;

front and rear openings at opposite ends of the tubular wall providing access to the hollow interior at the opposite ends of the tubular wall;

a hole through the tubular wall between the front and rear openings;

the interior surface includes a rib that extends across the hole, the rib extends circumferentially across the hole;

at least a portion of the interior surface is cylindrical and the portion of the interior surface extends across the rib; and the rib has an outwardly facing surface opposite the portion of the interior surface that extends across the rib and the outwardly facing surface tapers away from the hollow interior of the enclosure and toward the hole.

11. The enclosure of claim 10, wherein:

the tubular wall and the rib are one monolithic piece of metal.

12. An enclosure for an electrical device, the enclosure comprising:

a tubular wall having an exterior surface and an interior surface, the interior surface surrounding a hollow interior of the enclosure;

front and rear openings at opposite ends of the tubular wall providing access to the hollow interior at the opposite ends of the tubular wall;

a hole through the tubular wall between the front and rear openings;

the interior surface includes a rib that extends across the hole, the rib extends circumferentially across the hole, at least a portion of the interior surface is cylindrical and the portion of the interior surface extends across the rib; and the rib has front and rear edges adjacent the respective front and rear openings of the tubular wall, the front and rear edges separate the portion of the interior surface on the rib from an outwardly facing surface of the rib opposite the portion of the interior surface, and the outwardly facing surface draws to a peak as it extends from the front and rear edges toward the hole.

13. An enclosure for an electrical device, the enclosure comprising:

a tubular wall having an exterior surface and an interior surface, the interior surface surrounding a hollow interior of the enclosure;

front and rear openings at opposite ends of the tubular wall providing access to the hollow interior at the opposite ends of the tubular wall;

a channel formed into the interior surface;

a rib extending across the channel;

at least a portion of the interior surface is cylindrical and the portion of the interior surface extends across the rib;

the channel has a hole therethrough;

and the rib has front and rear edges adjacent the respective front and rear openings of the tubular wall, the front and rear edges separate the portion of the interior surface on the rib from an outwardly facing surface of the rib opposite the portion of the interior surface, and the outwardly facing surface draws to a peak as it extends from the front and rear edges toward the hole.

14. The enclosure of claim 13, wherein:

the tubular wall, the channel and the rib are all formed of one monolithic piece of metal.

15. An enclosure for an electrical device, the enclosure comprising:

a tubular wall having an exterior surface and an interior surface, the interior surface surrounding a hollow interior of the enclosure;

front and rear openings at opposite ends of the tubular wall providing access to the hollow interior at the opposite ends of the tubular wall;

a channel formed into the interior surface;

a rib extending across the channel;

the channel has a hole therethrough;

a protrusion extends from the exterior surface opposite the channel and the hole passes through the protrusion; and the protrusion has opposite ends adjacent the front and rear openings in the tubular wall and is wider at its opposite ends and narrower at a center of the protrusion between its opposite ends.

16. The enclosure of claim 15, wherein:

the interior surface is cylindrical and has a center axis that passes through the center of the hollow interior, the interior surface is spaced a first radial distance from the center axis; and the channel has a channel surface that is recessed into the interior surface and defines the channel, the channel surface extends radially outwardly from the interior surface and the center axis.

17. The enclosure of claim 15, wherein:

the protrusion has circumferentially opposite curved edges that curve and gradually converge toward each other as they extend from adjacent the front and rear openings in the tubular wall toward the center of the protrusion.

18. An enclosure for an electrical device, the enclosure comprising:

a tubular wall have an exterior surface and an interior surface, the interior surface surrounding a hollow interior of the enclosure and having a center axis;

front and rear openings at axially opposite ends of the tubular wall providing access to the hollow interior at the opposite ends of the tubular wall;

a hole through the tubular wall between the front and rear openings; and a rib extending across the hole transverse to the center axis, the rib has opposite ends adjacent opposite sides of the hole, and the rib is axially wider at the opposite ends and axially narrower at a center of the rib between its opposite ends.

19. The enclosure of claim 18, wherein:

the rib has axially opposite edges that curve and gradually converge toward each other as they extend from the opposite ends of the rib toward the center of the rib.

20. The enclosure of claim 18, wherein:

the rib is radially narrower at the opposite ends of the rib and radially wider at the center of the rib.

21. The enclosure of claim 20, wherein:

the rib has a constant radial cross-section area for any radial cross section of the rib between the opposite ends of the rib.

22. The enclosure of claim 18, wherein:

a channel is formed into the interior surface and the rib extends across the channel.

23. The enclosure of claim 18, wherein:

the center of the rib is positioned adjacent a center of the hole.

24. The enclosure of claim 18, wherein:

a protrusion extends from the exterior surface, the hole passes through the protrusion and the rib is inside the protrusion.

25. The enclosure of claim 24, wherein:

the protrusion has circumferentially opposite curved edges that curve and gradually converge toward each other as they extend from adjacent the front and rear openings in the tubular wall toward the hole in the protrusion.

26. The enclosure of claim 18, wherein:

at least a portion of the interior surface is cylindrical and the portion of the interior surface extends across the rib.

\* \* \* \* \*